United States Patent
Singh et al.

[11] Patent Number: 5,389,456
[45] Date of Patent: Feb. 14, 1995

[54] METHOD AND CLOSING PORES IN A THERMALLY SPRAYED DOPED LANTHANUM CHROMITE INTERCONNECTION LAYER

[75] Inventors: Prabhakar Singh, Export; Roswell J. Ruka, Pittsburgh, both of Pa.

[73] Assignee: Westinghouse Electric Corporation, Pittsburgh, Pa.

[21] Appl. No.: 195,935

[22] Filed: Feb. 14, 1994

[51] Int. Cl.$^6$ .................. H01M 8/10; B05D 5/12
[52] U.S. Cl. .................. 429/27; 29/623.5; 427/115; 429/31
[58] Field of Search .................. 429/30–33, 429/27; 29/623.5, 623.2; 427/115, 126.3, 446, 453

[56] References Cited

U.S. PATENT DOCUMENTS

| | | | |
|---|---|---|---|
| 3,823,302 | 7/1974 | Muehlberger | 219/121 P |
| 3,839,618 | 10/1974 | Muehlberger | 219/121 P |
| 4,049,841 | 9/1977 | Coker et al. | 427/34 |
| 4,597,170 | 7/1986 | Isenberg | 29/623.5 |
| 4,609,562 | 9/1986 | Isenberg et al. | 427/8 |
| 4,629,537 | 12/1986 | Hsu | 204/15 |
| 4,631,238 | 12/1986 | Ruka | 429/30 |
| 4,857,420 | 8/1989 | Maricle et al. | 429/30 |
| 4,861,345 | 8/1989 | Bowker et al. | 29/623.1 |
| 4,895,576 | 1/1990 | Pal et al. | 29/623.1 |
| 5,051,321 | 9/1991 | Kitagawa et al. | 429/30 |
| 5,080,689 | 1/1992 | Pal et al. | 29/623.5 |
| 5,085,742 | 2/1992 | Dollard et al. | 205/188 |
| 5,106,654 | 4/1992 | Isenberg | 427/115 |
| 5,143,751 | 9/1992 | Richards et al. | 427/126.3 |

FOREIGN PATENT DOCUMENTS

497542A1  1/1992  European Pat. Off.

*Primary Examiner*—Anthony Skapars
*Attorney, Agent, or Firm*—Daniel P. Cillo

[57] ABSTRACT

A dense, substantially gas-tight electrically conductive interconnection layer is formed on an air electrode structure of an electrochemical cell by (A) providing an air electrode surface; (B) forming on a selected portion of the electrode surface, a layer of doped LaCrO$_3$ particles doped with an element or elements selected from Ca, Sr, Ba, Mg, Co, Ni, Al and mixtures thereof by thermal spraying doped LaCrO$_3$ particles, either by plasma arc spraying or flame spraying; (C) depositing a mixture of CaO and Cr$_2$O$_3$ on the surface of the thermally sprayed layer; and (D) heating the doped LaCrO$_3$ layer coated with CaO and Cr$_2$O$_3$ surface deposit at from about 1000° C. to 1200° C. to substantially close the pores, at least at a surface, of the thermally sprayed doped LaCrO$_3$ layer. The result is a dense, substantially gas-tight, highly doped, electrically conductive interconnection material bonded to the electrode surface. A solid electrolyte layer can be applied to the nonselected portion of the air electrode. A fuel electrode can be applied to the solid electrolyte, to form an electrochemical cell, for example for generation of electrical power.

19 Claims, 5 Drawing Sheets

METHOD AND CLOSING PORES IN A THERMALLY SPRAYED DOPED LANTHANUM CHROMITE INTERCONNECTION LAYER

GOVERNMENT CONTRACT

The Government of the United States of America has rights in this invention pursuant to Contract No. DE-FC21-91MC28055, awarded by the United States Department of Energy.

BACKGROUND OF THE INVENTION

1. Field of the Invention

The invention relates to high temperature electrochemical cells, and to a method of forming a high temperature, dense, substantially gas-tight, electrically conductive interconnection layer on an electrode of an electrochemical cell. More particularly, the invention provides a method of closing pores in a porous plasma sprayed interconnection layer bonded to an electrode of a high temperature solid oxide electrolyte electrochemical cell, thereby forming a substantially gas-tight interconnection.

High temperature solid oxide electrolyte electrochemical generator devices are disclosed, for example, in Isenberg U.S. Pat. Nos. 4,395,468 and Isenberg U.S. Pat. No. 4,490,444. Such electrochemical generator devices comprise a plurality of elongated, typically annular, electrochemical cells or fuel cells which convert chemical energy into direct-current electrical energy. The fuel cells can be interconnected in series to provide a desired voltage and/or in parallel to provide a desired current capacity.

Each fuel cell typically includes an optional porous support tube of calcia stabilized zirconia. A porous annular air electrode or cathode generally surrounds the outer periphery of the support tube. The air electrode can be made with doped oxides of the perovskite family, such as, for example, lanthanum manganite ($LaMnO_3$). A dense layer of gas-tight solid electrolyte, typically yttria stabilized zirconia ($ZrO_2$), substantially surrounds the outer periphery of the air electrode. A porous fuel electrode or anode, typically of nickel-zirconia cermet or cobalt-zirconia cermet, substantially surrounds the outer periphery of the solid electrolyte. Both the solid electrolyte and the outer electrode, or, in this case the fuel electrode, are discontinuous to allow for inclusion of an electrically conductive interconnection material providing means to connect adjacent fuel cells. A selected radial segment of the air electrode, for example, is covered by the interconnection material. The interconnection material may comprise a doped lanthanum chromite ($LaCrO_3$) film. The generally used dopant is Mg, although other dopants such as Ca and Sr have been suggested. The dopant serves to enhance the conductivity of the lanthanum chromite p-type conductor.

Various methods have been used to apply the interconnection material to the air electrode. Conventionally, both the electrolyte and the interconnection material are applied to the surface of different selected portions of the air electrode by a modified electrochemical vapor deposition process, at temperatures up to 1450° C., with vaporized halides of zirconium and yttrium used for the electrolyte and vaporized halides of lanthanum, chromium, magnesium, calcium or strontium for the interconnection material, as taught in Isenberg U.S. Pat. Nos. 4,597,170 and Isenberg, et al. U.S. Pat. No. 4,609,562. The fuel electrode, typically nickel-zirconia cermet, is conventionally applied on top of the electrolyte, or grown on the electrolyte, by an electrochemical vapor deposition process, wherein nickel particles are anchored to the electrolyte surface by a vapor deposited skeleton of electrolyte material, as also taught in Isenberg, et al. U.S. Pat. Nos. 4,582,766 and Isenberg U.S. Pat. No. 4,597,170.

It has been found that there are certain thermodynamic and kinetic limitations in doping the interconnection material from a vapor phase by a vapor deposition process at temperatures between about 1300° to 1450° C. The vapor pressures of calcium chloride and strontium chloride, for example, are low at vapor deposition temperatures, and thus the transport of these dopants to the reaction zone at the surface of the air electrode is difficult. Therefore, magnesium has been used as the primary dopant for the interconnection material. However, magnesium doped lanthanum chromite has a substantial thermal expansion mismatch with the materials of the air electrode and electrolyte. For example, $La_{0.99}Mg_{0.01}CrO_3$ has a thermal expansion mismatch of 12–14%. Additionally, halide vapors at 1300° to 1400° C. in a reducing atmosphere at partial pressures of $O_2$ less that $1 \times 10^{-4}$ atm can interact with the air electrode during the initial period of interconnection application. This may cause the air electrode constituents, such as manganese, to leach into the interconnection material and increase resistivity, causing problems in the electrochemical generator output. Also, the long term stability of interconnection layers made by electrochemical vapor deposition techniques remains questionable even though these techniques initially form substantially leak tight interconnection layers.

Adequately doping the interconnection material with Ca, Sr and other dopants identified in the Isenberg patents could reduce the thermal expansion mismatch problem with the air electrode and electrolyte material, but is constrained by kinetic and thermodynamic limitations of the electrochemical vapor deposition process.

Ruka U.S. Pat. No. 4,631,238 attempts to solve potential interconnection thermal expansion mismatch problems between the interconnection material, electrolyte, electrodes and support materials. Ruka teaches cobalt doped lanthanum chromite, preferably also doped with magnesium, for example, $LaCr_{0.93}Mg_{0.03}Co_{0.04}O_3$, as a vapor deposited interconnection material using chloride vapors of lanthanum, chromium, magnesium and cobalt. Ruka similarly suffers from some kinetic and thermodynamic limitations.

Other methods of making doped $LaCrO_3$ interconnection materials have been tried. Bowker, et al. U.S. Pat. No. 4,861,345 in a different approach, deposits particles of $LaCrO_3$, doped with Mg, Sr, Ca, Ba or Co and coated with calcium oxide (CaO) or chromium oxide ($Cr_2O_3$), on an air electrode. The doped $LaCrO_3$ particles are solid-state sintered at high temperatures of about 1300° C. to 1550° C. Here, the coatings on the particles aid in sintering by providing a liquid phase which diffuses into the doped $LaCrO_3$ structure. However, sintering the doped particles of interconnection material at high temperatures of about 1300° C. to 1550° C. to make a leak tight interconnection film, and then bonding it to the air electrode can result in several problems. These problems include Mn leaching from the air electrode into the interconnection material and diffusion of interconnection material dopant into the air electrode.

Pal, et al. U.S. Pat. No. 4,895,576, in another approach, teaches forming a layer of metal oxide particles, e.g., Ca, Sr, Co, Ba and Mg, on the interconnection portion of an air electrode, heating the air electrode with the deposited layer to about 1300° C. to 1450° C., and vapor depositing a skeletal structure of lanthanum chromite interconnection material around and between the metal oxide particles at about 1300° C. to 1450° C. in the presence of metal halide vapors comprising lanthanum, chromium, and magnesium chlorides. The metal oxide deposit is incorporated into the lanthanum chromium oxide structure as it grows thicker with time on top of the air electrode. Pal then anneals the unit at about 1100° C. to 1400° C., whereby metal ions of the metal oxide particles diffuse into the bulk of the lanthanum chromite interconnection material. This process requires a long annealing step in addition to deposition steps, to maximize conductivity by distributing the dopant across the lanthanum chromium oxide film. Some of the dopant can diffuse into the air electrode at such high temperatures.

None of these proposed solutions solves all the problems of thermal expansion mismatch, Mn leaching from the air electrode, dopant leaching from the interconnection material, and problems associated with doping Ca, Sr, Co, Ba and other materials by vapor deposition. Thus, none is optimally effective for providing a uniformly thick, durable, leak tight, well bonded, electrically conductive interconnection on a variety of substrates in a simple and economical fashion. Many of the problems, including the leak tightness of the interconnection material, are inherent in the process used to form the interconnection material. There is a need for a method of forming an interconnection layer on an electrode of an electrochemical cell, which provides a highly doped, substantially gas-tight, electrically conductive interconnection material without the associated problems.

Plasma arc spraying and flame spraying, i.e., thermal spraying or plasma spraying, are known film deposition techniques. Plasma spraying involves spraying a molten powdered metal or metal oxide onto the surface of a substrate using a thermal or plasma spray gun. Coker, et al. U.S. Pat. No. 4,049,841 generally teaches plasma and flame spraying techniques. Muehlberger U.S. Pat. Nos. 3,823,302 and 3,839,618 generally teach plasma spray guns.

Plasma spraying is a technique that has been used for fabrication of components, other than the interconnection material, in high temperature, solid oxide electrolyte electrochemical cells. Plasma spraying, however, has not been effectively used for the fabrication of the interconnection material. Attempts to plasma spray an interconnection material on an electrode structure of an electrochemical cell have been found to remain porous after cell processing, and, further, to lead to intermixing of the fuel and oxidant during cell operation. Gas can pass through the structure, whereas prior vapor deposition and sintering techniques provided a closed pore structure. Such intermixing of fuel and oxidant resulting from leakage through the interconnection microstructure is detrimental to electrical power generation, and also to the stability of the cell. Accordingly, the efficiency and the life expectancy of the electrochemical cell are substantially reduced. It is desirable for long term electrochemical fuel cell operation and component stability to provide a substantially leak tight interconnection.

None of these references teach or suggest effectively plasma spraying an interconnection material, and providing a plasma sprayed interconnection that is substantially leak tight and highly electrically conductive. There is a need to provide a dense, substantially gas-tight, highly doped, electrically conductive interconnection material in an electrochemical cell. There is a further need to provide a dense, gas-tight, interconnection material in an electrochemical cell that is substantially free of pores, at least at the surface using plasma spraying and densification techniques. The invention is directed to a solution to these problems by providing a method to densify or close the pores of a plasma sprayed interconnection layer, thereby forming a gaseous diffusion barrier and, accordingly, a substantially leak tight interconnection, while also providing a highly doped, electrically conductive interconnection.

SUMMARY OF THE INVENTION

It is an object of the invention to provide a dense, substantially gas-tight, and also highly doped, electrically conductive interconnection material for an electrochemical cell.

It is another object of the invention to provide a thermally sprayed interconnection material on an electrode structure of an electrochemical cell, which is substantially gas-tight (i.e., substantially closed pores), well-bonded, highly doped, and highly electrically conductive.

It is yet another object of the invention to provide a method of densifying or closing pores in a thermally sprayed, e.g., plasma arc sprayed, interconnection layer, on an electrode structure of an electrochemical cell, to form a substantially leak proof interconnection.

It is a feature of the invention to provide a method of densifying or closing pores in a thermally sprayed interconnection layer, at least near the surface of the interconnection layer exposed to the fuel environment during cell operation.

It is an advantage of the invention to substantially close the pores of a thermally sprayed interconnection layer.

According to one aspect of the invention, the objects, features and advantages are achieved in a method of forming a dense, substantially gas-tight, electrically conductive interconnection layer on a porous electrically conductive electrode structure, characterized by the steps of: (A) providing an electrode structure; (B) forming by thermal spraying a doped $LaCrO_3$ powder, preferably by plasma arc spraying, on a selected portion of the electrode surface, a layer of doped $LaCrO_3$ having the general formula $La_{1-x}M_xCr_{1-y}N_yO_3$, where M is a dopant selected from the group consisting of Ca, Sr, Ba, and mixtures thereof, N is a dopant selected from the group consisting of Mg, Co, Ni, Al, and mixtures thereof, and where x and y are each independently about 0.01–0.25, to form a porous, electrically conductive interconnection material bonded to the electrode surface; (C) depositing a mixture comprising CaO and $Cr_2O_3$ capable of forming a liquid $CaCrO_4$ upon heating to the surface of the thermally sprayed porous, doped $LaCrO_3$ layer; and, (D) heating the porous, doped $LaCrO_3$ layer with the CaO and $Cr_2O_3$ surface deposit in air at from about 1000° C. to 1200° C., to substantially close the pores, at least as a surface, of the porous thermally sprayed interconnection layer with the liquid CaCrO₄, thereby forming a dense, substantially gas-tight, electrically conductive interconnection material bonded to the electrode surface.

According to another aspect, the invention provides a high temperature, solid oxide electrochemical cell, characterized by: a first electrode; a solid oxide electrolyte disposed on a first portion of the first electrode; a second electrode disposed on a portion of the solid electrolyte; an electrically conductive, substantially gas-tight interconnection material disposed on a second portion of the first electrode and capable of allowing electrical interconnection to at least one other high temperature, solid oxide electrochemical cell, said interconnection comprising a thermally sprayed, preferably plasma arc sprayed, doped $LaCrO_3$ layer, coated with a mixture of $CaO+Cr_2O_3$ and heated to temperatures of about 1000° C. to 1200° C. to substantially close the pores, at least at a surface, of the thermally sprayed doped $LaCrO_3$ layer.

Additional embodiments and aspects of the invention will be apparent from the following discussion of particular examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
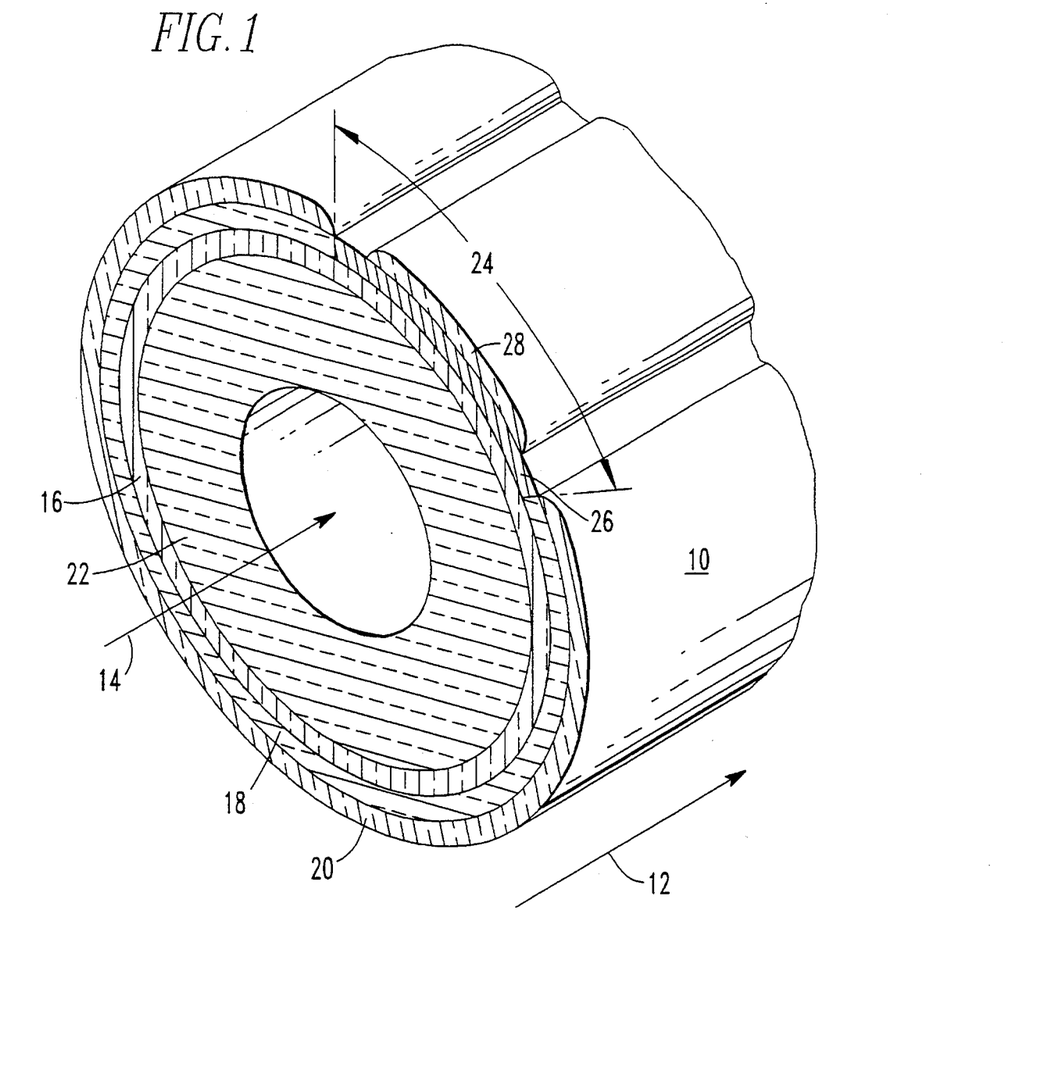
FIG. 1 is a schematic sectional view of a preferred embodiment showing a single, tubular, electrochemical cell, the interconnection layer formed by the method of this invention being shown on the top of a supporting electrode.

Referring to FIG. 1, a preferred, tubular, electrochemical cell 10 is shown. The preferred configuration is based upon a fuel cell system wherein a flowing gaseous fuel, such as hydrogen, carbon monoxide or unreformed hydrocarbon gases, is directed over the outside of the cell, axially in the embodiment of FIG. 1 in the direction shown by arrow 12. An oxidant, such as air or $O_2$, is directed through the inside of the cell, as shown by arrow 14. Oxygen molecules pass through porous electrically conductive air electrode structure 16 and are convened to oxygen ions which pass through an electrolyte 18, to combine with the fuel at a fuel electrode 20.

The foregoing description of the preferred tubular configuration is merely an example and should not be considered limiting in any manner. It is possible that other configurations for the electrochemical cell 10 could be used, for example, planar shaped cells. In addition, the interconnection material of the invention, as described below, can be applied to a variety of substrates and to electrochemical cells other than fuel cells. The invention is applicable to such variations with reversed cell electrodes and the like, or so-called "inverted" cell, and similar such variations. In this case, we rearrange the location of the fuel and oxidant, for example such that air or $O_2$ flows over the outside of the cell and the fuel flows through the inside of the cell. As applied to fuel cells, for example, the term "air electrode" as used herein refers to the electrode which will be in contact with an oxidant, and "fuel electrode" refers to the electrode that will be in contact with the fuel.

The electrochemical cell 10 can include an optional, porous support tube 22. This support tube can comprise calcia stabilized zirconia forming a porous wall approximately one to two millimeters thick. The air electrode or cathode 16 is a porous, composite metal oxide structure approximately 50 microns to 1500 microns (0.05 millimeter to 1.5 millimeters) thick. The air electrode can be deposited on the support tube by well known slurry dip and sintering techniques, extruded as a self-supporting structure, etc. The air electrode comprises, for example, doped oxides or mixtures of oxides of the perovskite family, such as, $LaMnO_3$, $CaMnO_3$, $LaNiO_3$, $LaCoO_3$, $LaCrO_3$, and the like. Preferred dopants are Sr, Ca, Co, Ni, Fe, Sn, Ba, Ce, and the like.

A layer of dense, gas-tight solid electrolyte 18 surrounds most of the outer periphery of the air electrode 16. The electrolyte comprises, for example, yttria stabilized zirconia about 1 micron to about 100 microns thick (0.001 millimeter to 0.1 millimeter). The electrolyte can be deposited onto the air electrode by well known, high temperature, electrochemical vapor deposition techniques. In the case where the electrolyte is to be deposited before the interconnection material, a selected radial segment or portion 24 of the air electrode 16 is masked during electrolyte deposition to make the electrolyte discontinuous for inclusion of a layer of non-porous, gas-tight, electrically conductive interconnection material 26 made according to the method of the invention which is deposited on this segment or portion 24. If the interconnection material is to be deposited first, then the electrolyte portion of the air electrode is masked initially.

The dense interconnection material 26, which preferably extends the active axial length of each elongated cell 10 as shown, must be electrically conductive in both an oxidant environment and a fuel environment. The term "electrically conductive" as used herein means conducting electrons but not substantially conducting ions. The gas-tight interconnection 26 can be roughly similar in thickness to the electrolyte, approximately 30 microns to about 100 microns (0.03 millimeter to 0.1 millimeter) thick. The interconnection should be non-porous, namely over about 95% dense and preferably 99% dense. The interconnection material is highly electrically conductive at temperatures of about 1000° C., the usual operating temperature of a fuel cell. The interconnection is preferably dense enough to be substantially leak proof and advantageously has a coefficient of thermal expansion close to that of the solid electrolyte and the electrode onto which it is deposited, and the other components, including the support tube, if used. A preferred interconnection material is doped lanthanum chromite ($LaCrO_3$).

A fuel electrode or anode 20 substantially surrounds the solid electrolyte 18. The fuel electrode or anode 20 is porous, and can comprise, for example, nickel- or cobalt-zirconia cermet. As shown, the fuel electrode 20 also is discontinuous, being spaced from the interconnection 26 by a distance sufficient to avoid direct electrical communication between the fuel electrode 20 and both the interconnection 26 and the air electrode 16. The fuel electrode is approximately 100 microns (0.1 millimeter) thick. The fuel electrode can be deposited on the electrolyte, for example, by well known electrochemical vapor deposition techniques, where nickel particles are anchored to the electrolyte surface by a vapor deposited skeleton of electrolyte material.

Usually, an electrically conductive top layer 28 is deposited over the interconnection layer 26. This top layer is preferably comprised of the same material as the fuel electrode, namely nickel or cobalt-zirconia cermet is this example, and is about the same thickness, approximately 100 microns (0.1 millimeter).

The foregoing elements form an electrochemical cell. The interconnection serves as an electrical interconnection to an electrode of a second electrochemical cell. The electrical connection is made along the axial length of the interconnect through a metal fiber felt (shown in FIG. 2). Each fuel cell is preferably tubular and typically is electrically connected in series with an adjacent fuel cell, although various serial and parallel arrangements are possible. A typical single cell generates an open circuit (unloaded) voltage of about one volt. The electrical power that can be supplied is a function of the dimensions of the cell, the supply of fuel and oxidant, and other factors. Multiple cells can be connected in series and/or parallel to achieve desired levels of voltage and current output from the electrochemical generator as a whole.

Figure 2:
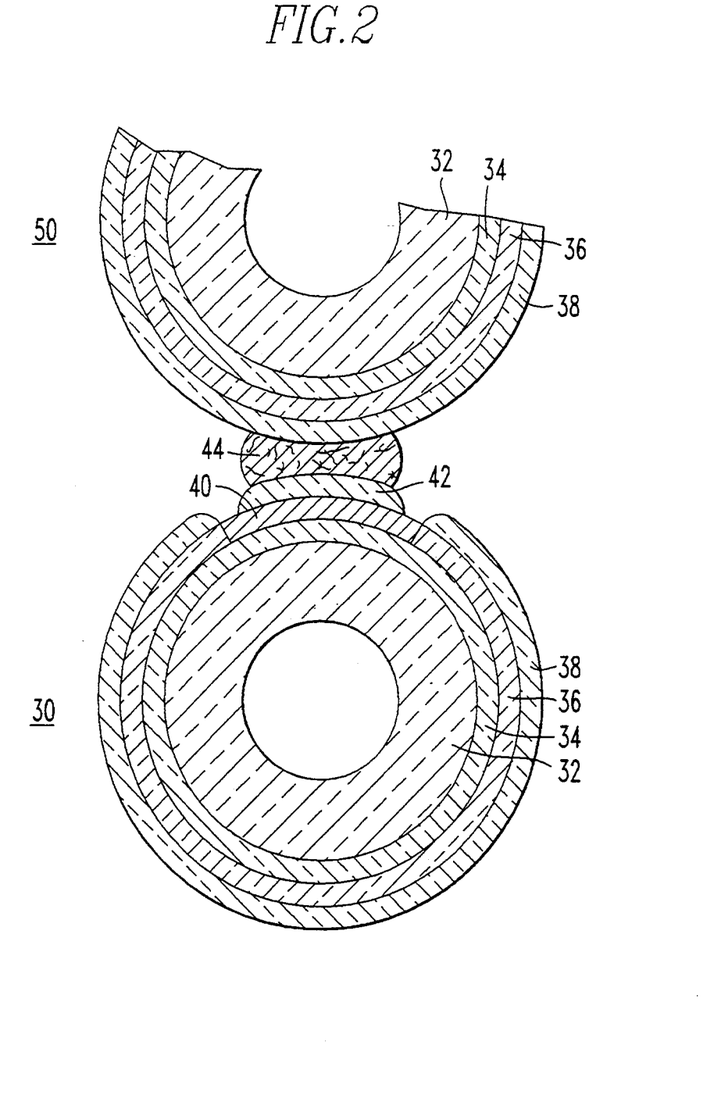
FIG. 2 is a schematic sectional view of two adjacent electrochemical cells, electrically connected by the interconnection layer formed according to the invention.

Referring to FIG. 2, an electrochemical cell 30 is electrically connected in series to an adjacent electrochemical cell 50 along an interconnection 40 as shown. The first electrochemical cell 30 includes a porous support tube 32 and a porous, tubular, inner air electrode 34 generally surrounding the porous support tube. Generally surrounding the air electrode 34 is a solid electrolyte 36. Substantially surrounding the electrolyte is an outer fuel electrode 38. A selected radial segment of the air electrode is discontinuous and contains a non-porous, gas-tight, electrically conductive interconnect 40 along the discontinuity. As shown in FIG. 2, the fuel electrode 38 is also discontinuous, being spaced from the interconnection 40 a distance sufficient to avoid direct electrical communication between the fuel electrode 38 and both the interconnection 40 and air electrode 34. An electrically conductive layer 42, which is preferably made of the same material as the fuel electrode 38, is deposited over the interconnection 40.

In the example shown, a second electrochemical cell 50 is connected in series with the first electrochemical cell 30 via the electrically conductive interconnection 40, preferably extending the axial length of the fuel cell. The electrical interconnection preferably is enhanced by an optional metal fiber felt 44, for example, made of nickel fibers. The felt extends axially between the annular cells 30 and 50. In an inverted cell structure (where fuel flows inside the cells and the electrodes are reversed), the felt material is made from conducting oxide fibers, such as doped $In_2O_3$ or the like.

During operation of the depicted cells, air or $O_2$ flows through the center of the cells, and fuel passes over the exterior. Oxygen molecules diffuse through the optional porous support and air electrode or cathode. Fuel diffuses through the fuel electrode or anode. Oxygen ions pass through the electrolyte. These reactants interact via the actions of the electrolyte and electrodes, producing products such as water vapor and carbon dioxide, as well as generating heat and electrical energy. The high temperature water vapor and carbon dioxide are carried away, for example together with unburned fuel. Current is transferred by current in part through the inner cathode 34 of one cell, through the electrically conductive interconnect 40, and metal felt 44, to the outer anode 38 of the second cell, and ultimately through the load via leads (not shown). A highly conductive interconnect is very important. Electrical resistances in the cells and their interconnections limit the potential efficiency of the electrochemical generator due to the dissipation of electrical energy in the resistive heating of such resistances.

Undoped lanthanum chromite is not very useful as an electrical interconnection, due to adverse characteristics including marginal conductivity and mismatched thermal expansion properties as compared to the rest of the fuel cell components. Doped lanthanum chromite, however, has excellent properties as an electrical conductor. Doping can also increase the coefficient of thermal expansion of lanthanum chromite, to obtain a better expansion match with the rest of the fuel cell components. Presently used lanthanum chromite interconnections are produced by electrochemical vapor deposition (EVD) or sintering at relatively high temperatures.

Preferred interconnection materials are non-porous and have a resistivity of less than 50 ohm-cm at 1000° C., a typical operating temperature of the fuel cell, making them highly electrically conductive. Other advantageous properties include moderate material cost and nearly unvarying composition when exposed to either fuel or oxidant atmospheres. The interconnection material should be non-reactive with other cell components at 1000° C., have negligible metal ion conduction, be free of destructive phase transformations in the region from 25° C. to 1200° C., have low volatility of oxide components in the working atmosphere, and be subject to fabrication as a thin layer, impervious to oxygen gas and have low ionic conductivity when exposed to a fuel atmosphere at 1200° C. The interconnection material should have a coefficient of thermal expansion as close as possible to that of the solid electrolyte and the electrode on which it is deposited, and the other components, including the optional support tube, to provide good longevity over cycles of temperature variation.

The interconnection material of the invention has surprisingly been found to be suitable in all these categories. The interconnection material comprises a thermally sprayed, preferably plasma arc sprayed, doped lanthanum chromite ($LaCrO_3$) layer deposited onto an electrode surface, which is then filled with a molten mixture of $CaO + Cr_2O_3$, e.g.. $CaCrO_{4(l)}$, to at least physically interact with the bulk doped lanthanum chromite and to densify and close the pores of the thermally sprayed interconnection material. This provides a highly doped, dense, substantially gas-tight interconnection material or structure, suitable for use as an electrical connection between adjacent electrochemical cells. Preferred dopants are Ca, Sr, Ba, Mg, Co, Ni and Al.

Plasma arc sprayed doped lanthanum chromite (LaCrO$_3$) interconnection layers deposited on the surface of an electrode, for example, an air electrode, have been found to remain porous after cell processing. Typically the layers are about 5–15% porous by volume porous. Such porosity leads to undesirable intermixing of the fuel and the oxidant during electrochemical cell operation. Intermixing of fuel and oxidant not only reduces the efficiency of the electrochemical generator due to localized burning of the fuel (as opposed to generation of electrical power), but also degrades the cell components, such as the air and fuel electrode, reducing the life expectancy and reliability of the cells and the generator.

Thus, for prolonged cell life and stable cell component structures, leak proof interconnection layers are desirable. It has been found according to the invention that the gas-tightness of these thermally sprayed interconnection coatings, e.g., plasma arc sprayed, can be substantially enhanced by a post treatment, described in detail below. Thus, plasma arc spraying techniques followed by closing the pores with molten calcium chromate provides a gas-tight, as well as a highly doped, electrically conductive interconnection material. The invention further provides distinct advantages over electrochemical vapor deposition or sintering techniques.

In the method of the invention, doped particles of lanthanum chromite (LaCrO$_3$) are made or obtained using standard solid-state or solution derived techniques. Preferred dopants comprise at least one of Ca, Sr, Ba, Mg, Co, Ni and Al, distributed throughout the interconnection material. Particularly, doped oxides of the perovskite structure ABO$_3$, preferably doped LaCrO$_3$ particles having the general formula La$_{1-x}$M$_x$Cr$_{1-y}$N$_y$O$_3$, where M is a dopant selected from the group of Ca, Sr, Ba, and the like, or mixtures thereof, N is a dopant selected from the group of Mg, Ni, Co, Al, and the like, or mixtures thereof, and x and y are each independently about 0.01–0.25.

The doped LaCrO$_3$ particles can further be agglomerated by well known agglomeration techniques to provide a freely flowing plasma spray feed powder. It is preferred that the plasma spray feed particles have a uniform particle size distribution with an average particle size range of from 5–80 microns in diameter, preferably 10–44 microns in diameter, and are freely flowing to facilitate plasma spraying. A narrow average particle size range, such as 10–44 microns in diameter, is preferred for precision injection, higher melting, lower differential volatilization of the interconnection constituents, e.g., chromium or dopant, and more uniform splat formation. A coarser average particle size range ($-200$ to $+400$ U.S. screen mesh), about 36–52 microns in diameter, can also be used, although finer particles are generally preferred.

A preferred method of making doped LaCrO$_3$ particles having large agglomerate sizes, spherical shapes and narrow particle size distributions and which are also free flowing is by spray drying techniques. A more detailed description of spray drying is described in Keith Masters, *Spray Drying Handbook*, Halsted Press Div., John Wiley and Sons, NY, N.Y., (1985), which is hereby incorporated by reference. Other agglomeration techniques which can be used to make doped LaCrO$_3$ particles include, for example, sintering such particulate materials at substantial pressures and temperatures of over 1700° C. Care must be taken to maintain the desired La/Cr and La/dopant ratios in the agglomerated powder.

The physical properties of the agglomerated spray feed powders are important because they affect powder mass flow rate in feeding the plasma plume. A powder which flows freely allows the feed rate of the powder to be more uniformly controlled by the plasma spray gun. Advantageous consequences of more uniform powder form include a more homogeneous microstructure and better coating thickness control. The agglomeration techniques to provide larger agglomerate sizes, more spherical agglomerates (with lower frequency of broken agglomerates) and having a narrow or monodisperse particle size distribution formed, for example, by spray drying techniques, provide for optimal flow and spray parameters.

In the method of the invention, the doped LaCrO$_3$ particles, preferably agglomerated powders, are next thermally sprayed or, in other words, plasma sprayed, e.g. by plasma arc spraying or by flame spraying techniques, onto portions of the surface of an electrode structure, such as selected portions of an air electrode of the electrochemical cell. These and similar techniques to hot spray metal or metal oxide containing powders are encompassed by the terms "thermal spraying" or "plasma spraying" as used herein. More detailed descriptions of thermal spraying techniques are provided in Coker, et al. U.S. Pat. No. 4,049,841 and Dollard, et al. U.S. Pat. No. 5,085,742, the disclosures of which are hereby incorporated in their entirety. Plasma spray guns or devices used in plasma spraying are generally disclosed in Muehlberger U.S. Pat. Nos. 3,823,302 and 3,839,618, which are also hereby incorporated.

Among the thermal spraying techniques, plasma arc spraying can be used. Plasma arc spraying generally comprises use of an electric arc discharge through which a gas is passed. As the gas passes the electric arc, it is ionized to obtain a plasma of ionized gas. The plasma is mixed with a powder metal or metal oxide, e.g., doped LaCrO$_3$, which is suspended or entrained in a carrier gas. A plasma spray gun is used to discharge the plasma gas, whereby the entrained metal or metal oxide powder is directed to impinge upon a substrate whereupon a metal or metal oxide film is formed. The gases employed in plasma arc spraying are typically nitrogen, argon, hydrogen, or the like. The hydrogen, argon, etc., are ionized as the plasma and the powder metal or metal oxide is suspended in the nitrogen carrier gas. Plasma arc spraying involves fusing a metal or metal oxide containing powder onto a surface. The arc temperature causes a molten-droplet of the metal or metal oxide to impinge on a surface and solidify or freeze thereon.

Flame spraying can also be used. Flame spraying generally comprises spraying and fusing a powder metal onto a surface with a flame. Such flames are generated with a torch or similar apparatus such as oxyacetylene torches, as disclosed, for example, in U.S. Pat. Nos. 2,786,779; 3,220,068; and, 3,238,060, the disclosures of which are hereby incorporated. Plasma arc spraying is preferred since it provides a higher temperature than flame spraying, and consequently results in a greater degree of bonding.

It has been found that either plasma arc spraying or flame spraying an interconnection layer on an electrode surface similarly produce coating densities of only about 85% to 95% (i.e., about 5 to 15% porous), whereby gas can pass through the structure, whereas prior electrochemical vapor deposition and sintering techniques provided closed pore structures. It has also been found that a plasma sprayed interconnection, which is not leak tight, has led to intermixing of fuel and oxidant during cell operation which is detrimental to cell operation and cell stability. However, on the other hand, plasma arc or flame spraying techniques are desirable since they allow for the formation of highly doped electrically conductive interconnection material, and further provide distinct advantages over conventional electrochemical vaporization and sintering techniques. Thus, the inventors have focused on a method of densifying or closing the pores of a porous, thermally sprayed interconnection, thereby advantageously using thermal spraying techniques while also providing a substantially leak-tight structure, at least at the surface of the interconnection exposed to the fuel environment, to effectively function as an electrical interconnect between adjacent electrochemical cells.

It has been found that a suitable high energy plasma spray can be generated employing an arc discharge having a voltage of about 30 to 60 volts and a current of about 400 to 900 amperes. The arc discharge is preferably about 20 to 40 kilowatts, most preferably about 22 kilowatts. Such a plasma spray can be generated by a variety of commercial devices, for example, a Miller Thermal Plasma Spray Gun, Model No. SG-100, having an anode, Model No. 2083-175. A preferred plasma spray gun includes a large bore nozzle. It further includes a perpendicular powder injection angle, as opposed to a backward injection angle, which produces the least amount of $Cr_2O_3$ and/or dopant differential volatilization over the particle size range. A backward injection angle can be used if the powder is sufficiently compensated with $Cr_2O_3$, and also with the dopant.

It is further preferred that the plasma gas comprises Ar primary gas, for example, about 8 to 40 slpm (standard liters per minute), and $H_2$ secondary gas, for example, about 0.15 to 2 slpm, when spraying in air. It is also preferred that the doped $LaCrO_3$ powder feed rate is in the range of 2 to 40 grams per minute, preferably 6 to 20 grams per minute, with the use of vibratory feeders. The powder carrier gas flow rate is preferably 0.5 to 5 slpm, more preferably 1 to 4 slpm. The plasma spray distance between the plasma gun nozzle and the substrate in air is preferably 3 inches or less, more preferably 2.5 inches or less. The spray distance to the substrate is preferably 1 to 2 mm of the selected spray distance.

It is also preferred that the plasma be directed perpendicular to the substrate. Low angle spraying of the molten droplets tends to produce porosity in the deposit and should be avoided. Since the metal oxide powder feed rate is high and the spray distance is close, the plasma spray gun is traversed along the selected radial segment of the electrode, for example, the air electrode of an electrochemical cell, at a constant velocity, preferably greater than about 40 meters per minute (67 cm per sec.). Preferably the movement is incremental in order to deposit successive overlapping strips. It has also been found that a number of passes of the plasma spray gun over the selected portions of the electrode may be required to provide a uniformly thick coating.

The technique of thermal spraying, e.g., plasma arc spraying, the $ABO_3$ perovskite interconnection powder, e.g., doped $LaCrO_3$ powder, has been found to volatilize some of the constituents of the interconnection material during thermal spraying. For example, stoichiometric plasma-sprayed Sr doped $LaCrO_3$ powder particles having the general formula $La_{1-x}Sr_xCrO_3$, where x is 0.075-0.25, e.g., $La_{0.86}Sr_{0.14}CrO_3$, can result in the formation of an interconnection layer that is slightly off chemistry, i.e., not stoichiometric, due to volatilization of $Cr_2O_3$ and to a lesser extent the dopant, e.g., SrO, during spraying. It is preferred to increase (compensate) the amount of the volatile constituents in the interconnection spray feed powder proportionately in order to spray a coating that has final bulk chemistry either equal to stoichiometric, e.g., $La_{0.86}Sr_{0.14}CrO_3$, or any desired chemistry with specific ratios of La to Cr and/or La to M where M is dopant, e.g., Sr, and/or (La+M)/Cr where M is dopant, e.g., Sr. Ratios of (La+M)/Cr>1 may result in localized hydration under humid environmental conditions and crack, which is undesirable. It is, therefore, in some instances, preferred to sufficiently compensate the plasma spray feed powder with chromium as $Cr_2O_3$, to form an interconnection layer after plasma spraying that is a mixture of two phases, e.g., $La_{0.86}Sr_{0.14}CrO_3 + Cr_2O_3$, onto the air electrode. The compensated amount of $Cr_2O_3$ preferably can be in the range of 0-50% mol, more preferably 10-30% mol. The dopant can be similarly compensated, although a slight decrease in the dopant content will not significantly affect the physical, chemical and electrical properties of the deposited interconnection layer.

The technique of thermal spraying the interconnection powder has also been found to deposit an interconnection layer that develops, in addition to porosity, microcracks and macro-cracks within the surface coating. The doped $LaCrO_3$ particle, deposited by being plasma arc sprayed onto an electrode, may tend to crack even when applied to an electrode composition having similar thermal expansion properties. Because there is a steep temperature gradient between the freezing or solidifying deposit and the substrate during the cooling process, the deposit tends to shrink considerably more than the substrate during cooling. Most resulting tensile stresses are relieved by cracking and separation of the splats. Depending on the magnitude of the volume accommodation, large or macro-cracks can extend down from the surface of the deposit to the substrate surface.

In order to minimize crack formation, the interconnection deposit can be sprayed on a substrate that is heated, for example just to the freezing temperature of the molten sprayed powder. However, due to the unique ability of the preferred compensated powder composition to close coating cracks, acceptable gas barrier films can be plasma sprayed onto room temperature substrates. For example, the $La_{0.84}Sr_{0.16}CrO_3 + Cr_2O_3$ rich phase compensated composition which results from the plasma spraying the $Cr_2O_3$ compensated composition has thermal expansion characteristics very similar to that of air electrodes, typically strontium or calcium doped lanthanum manganite.

An exemplary thermally sprayed, e.g., plasma arc sprayed, interconnection material, e.g., doped $LaCrO_3$ powder, deposited onto an electrode surface using the techniques described above provides a layer of interconnection material wherein the dopant is substantially uniformly distributed throughout the bulk lattice, thereby providing a highly doped material. However, the thermal spraying also provides a porous layer of interconnection material, approximately 85-95% of theoretical density (approximately 5% to 15% by volume porous). Thus, although highly doped for electrical conductivity, the plasma deposited interconnection material suffers from not being gas-tight, thereby allowing substantial amounts gas to pass through its microstructure. For effectiveness, it is desirable that the interconnection material, or at least a surface thereof, be substantially gas-tight, to act as a gaseous diffusion barrier so that the fuel and oxidant do not leak through during electrochemical operations. According to the invention, the inventors have discovered that the gas-tightness of the thermally deposited interconnection coating can be enhanced by a post treatment process to sufficiently close the pores or densify the layer.

Although thermal spraying, especially plasma arc spraying, provides high dopant concentrations in the $ABO_3$ perovskite, e.g., $LaCrO_3$, interconnection material, it is limited in that it can only produce densities of the interconnection material of about 85%–95% of theoretical density (from about 5 to 15% porous). Furthermore, the densities produced are not uniform, i.e., having different densities in distinct localized regions. In order to use a plasma sprayed deposit as an effective interconnection material, it should have greater than 95% of theoretical density, and at the same time be leak-tight to prevent intermixing of gases. It is, therefore, desirable to enhance the gas-tightness of this coating. The interconnection material produced according to the method of the invention is advantageously densified in its bulk lattice, at least at the surface, more preferably at least at the surface in contact with the fuel electrode, i.e., at the surface exposed to the fuel, to form an interconnection that is leak proof in its operative position in the electrochemical fuel cell.

Figure 3:
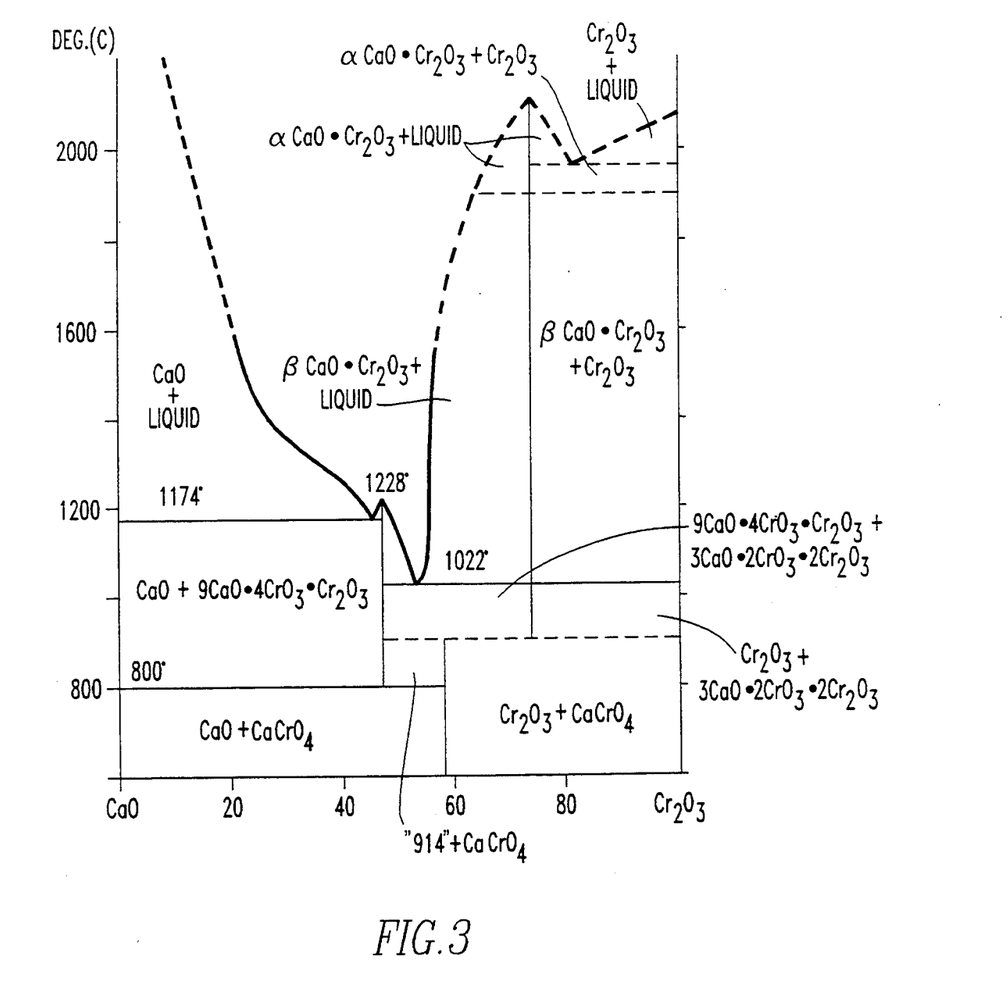
FIG. 3 is a phase diagram of a $CaO+Cr_2O_3$ system.

According to an aspect of the invention, the plasma arc sprayed interconnection material is post treated to enhance its gas-tightness characteristics. After formation of the plasma sprayed layer of interconnection material on the surface of the electrode, the inventors have discovered a method, not heretofore taught or suggested, of depositing a mixture comprising calcium oxide (CaO) and chromium oxide ($Cr_2O_3$), and capable of forming $CaCrO_4$, onto the plasma sprayed interconnection layer, and subsequently heat treating in air at about 1000° to 1200° C., preferably 1100° to 1200° C. At these temperatures, the liquified mixture of CaO and $Cr_2O_3$ it is believed forms, in sufficient part, calcium chromate ($CaCrO_{40}$) (as shown in the phase diagram of FIG. 3) which, while not wishing to be bound by a theory, effectively interacts with and densities the plasma sprayed interconnection layer, at least at the surface containing the deposited mixture, thereby substantially closing the pores as well as possibly locally diffusing into the bulk lattice of the interconnection layer to achieve substantial gas-tightness.

By depositing a mixture of calcium oxide and chromium oxide material, typically a $CaO+Cr_2O_3$ mixture, on the surface of the plasma sprayed layer, e.g., doped $LaCrO_3$ having the general formula $La_xM_{1-x}Cr_yN_{1-y}O_3$, where M is a dopant selected from the group of Ca, Sr, Ba; N is a dopant selected from the group of Mg, Ni, Co and Al; and, x and y are each independently 0.01–0.25, and heating in a suitable atmosphere at about 1000° to 1200° C., a dense and gas-tight (i.e., substantially leak proof) plasma sprayed layer, preferably a plasma arc sprayed layer, can be formed on a porous electrode structure, preferably on a selected portion of an air electrode of an electrochemical cell, to serve as the interconnection. The inventors believe, while not wishing to be bound by theory, that as a result both physical plugging of the pores and cracks in the porous thermally sprayed interconnection layer, and also diffusion into the bulk lattice of the doped $LaCrO_3$ plasma sprayed interconnection layer occurs.

In the method of the invention, after forming by plasma spraying the porous layer of interconnection material on the surface of the electrode, it is preferred that the surface finish be about 60 rms (route mean square). If rougher than 60 rms, the plasma sprayed coating can be smoothed, for example, by wet sanding with 600 grit silicon carbide or alumina paper, or by grit blasting. Also air bubble defects in the substrate, e.g., the electrode, which result in defects in the plasma sprayed deposit can be repaired by sanding. Defects within the substrate below the deposit act to raise the level of localized stress and may provide crack initiation sites when there is localized surface heating of the substrate during the spraying process. Thus, it is also preferred to eliminate defects within or close to the surface of the substrate prior to plasma spraying to increase the thermal shock resistance of the substrate during the spraying process.

In the method of the invention, the porous, thermally sprayed interconnection layer on the electrode structure is then coated with a mixture of $CaO+Cr_2O_3$ which can be in a solid tape form or in a slurry. The mixture preferably has a weight ratio of calcium oxide to chromium oxide of 0.5:3, more preferably 1:2, and which capable of forming, in part, calcium chromate, $CaCrO_4$, upon heating. The $CaO+Cr_2O_3$ mixture is preferably applied to the porous thermally sprayed interconnection layer on the selected radial segment of the electrode structure. The mixture can be brushed or painted on, applied by a tape casting method, or by other known techniques, preferably which do not require pressing the thin and fragile electrode structure.

In the method of the invention, the coated porous interconnection layer having the surface deposit of $CaO+Cr_2O_3$ is subsequently heated in a suitable atmosphere, for example, air, such that the surface deposit forms, at least in part, a $CaCrO_4$ liquid phase. The heating temperature is preferably from about 1000° to 1200° C., more preferably from about 1100° to 1200° C. Higher temperatures should be avoided to prevent inter-diffusion of interconnection components with air electrode components which is undesirable. During exposure to temperatures up to 1200° C. in air, the calcium chromate ($CaCrO_4$) melts, forming a molten liquid phase, and fills the pores in the interconnection layer leaving a substantially continuous coating layer. Melting of the $CaCrO_4$ composition at these temperatures is evident from the phase diagram shown in FIG. 3. Prolonged exposure to heating further leads to interaction of the bulk lattice of the interconnection layer, such as doped $LaCrO_3$, with $CaCrO_4$ which results in further doping of the $LaCrO_3$ lattice with Ca. Higher conductivity of the interconnection layer can be obtained with increased dopant concentration. In the method of the invention, after densification and cooling, melted and unmelted surface deposits can be removed by wet sanding or grit blasting. Also, any excess chromium oxide phase (insulating) formed on the surface can be removed by wet sanding or grit blasting to expose the electrically conductive interconnection surface.

The dense layer formed at least at the surface of the thermally sprayed interconnection layer, via by depositing the mixture of calcium oxide and chromium oxide and heating, acts as a gaseous diffusion barrier and, accordingly, effectively prevents intermixing of fuel and oxidant during electrochemical cell operations. In a preferred method of the invention, the porous, thermally sprayed interconnection material is densifed at and/or slightly below the surface exposed to the fuel, and the remainder of the bulk lattice of the thermally sprayed interconnection material is left porous. Electrical conductivity is consequently improved by the presence of pores in the bulk interconnection layer, which maintains equilibrium with the oxidant.

The void volume in the plasma sprayed interconnection layer is effectively reduced using the densification process of the invention, thus providing a substantially gas-tight, high density, highly doped, electrically conductive interconnection layer on an electrode structure. The final leak proof thermally sprayed interconnection layer should be at least 95% of theoretical density, preferably at least 99%. The method of the invention provides distinct advantages over prior electrochemical vapor deposition and sintering techniques.

A solid electrolyte layer preferably is applied over the remaining portion of the air electrode, if the electrolyte is to be applied after the interconnection, and a cermet fuel electrode is applied over the electrolyte. An optional cermet layer can be applied over the interconnection, to complete the formation of an electrochemical cell. This arrangement is especially advantageous for a high temperature, solid oxide electrolyte fuel cell, and is generally useful for various electrochemical cells with similar aspects. According to the fuel cell application, each cell is preferably tubular and connected at least in series to an adjacent fuel cell to form an electrochemical generator. The electrical connection is typically made along the axial length of the interconnection layer through a metal fiber felt as shown in FIG. 2. A typical cell generates an open circuit voltage of approximately one volt, and multiple cells can be connected in series and/or parallel to provide the desired system current and voltage. The invention is illustrated further with reference to the following practical example.

EXAMPLE 1

A high temperature, solid oxide electrolyte fuel cell tube was prepared. Initially a porous support tube of calcia stabilized zirconia was generally surrounded by a porous fuel electrode of doped lanthanum manganite using standard techniques. The air electrode was masked except for a selected radial segment along the axial length of the tube onto which an interconnection layer of doped lanthanum chromite particles was thermally sprayed thereon by plasma arc spraying.

The air electrode-plasma sprayed interconnection composite was then coated with a mixture of calcium oxide and chromium oxide using a tape. The CaO+Cr$_2$O$_3$ coated tubular section was then heated in air at about 1100° C. for approximately 1 hour and followed by exposure at about 1200° C. for approximately 2 hours. A 2° C./min heating rate was used up to about 600° C. Above 600° C., a 5° C./min heating rate was used. After heating, the interconnection layer was allowed to cool and then grit blasted. Melted and unmelted surface deposits were removed during grit blasting.

The interconnection layer was then masked using standard techniques, and an electrolyte of yttria stabilized zirconia was applied over the unmasked remaining portions of the air electrode using standard techniques. A fuel electrode of nickel zirconia cermet was applied over the electrolyte using standard techniques.

The cell was checked for leak tightness after electrolyte and fuel electrode application. Lower leak rates (<10 mm Hg/min.) were obtained.

Figure 4:
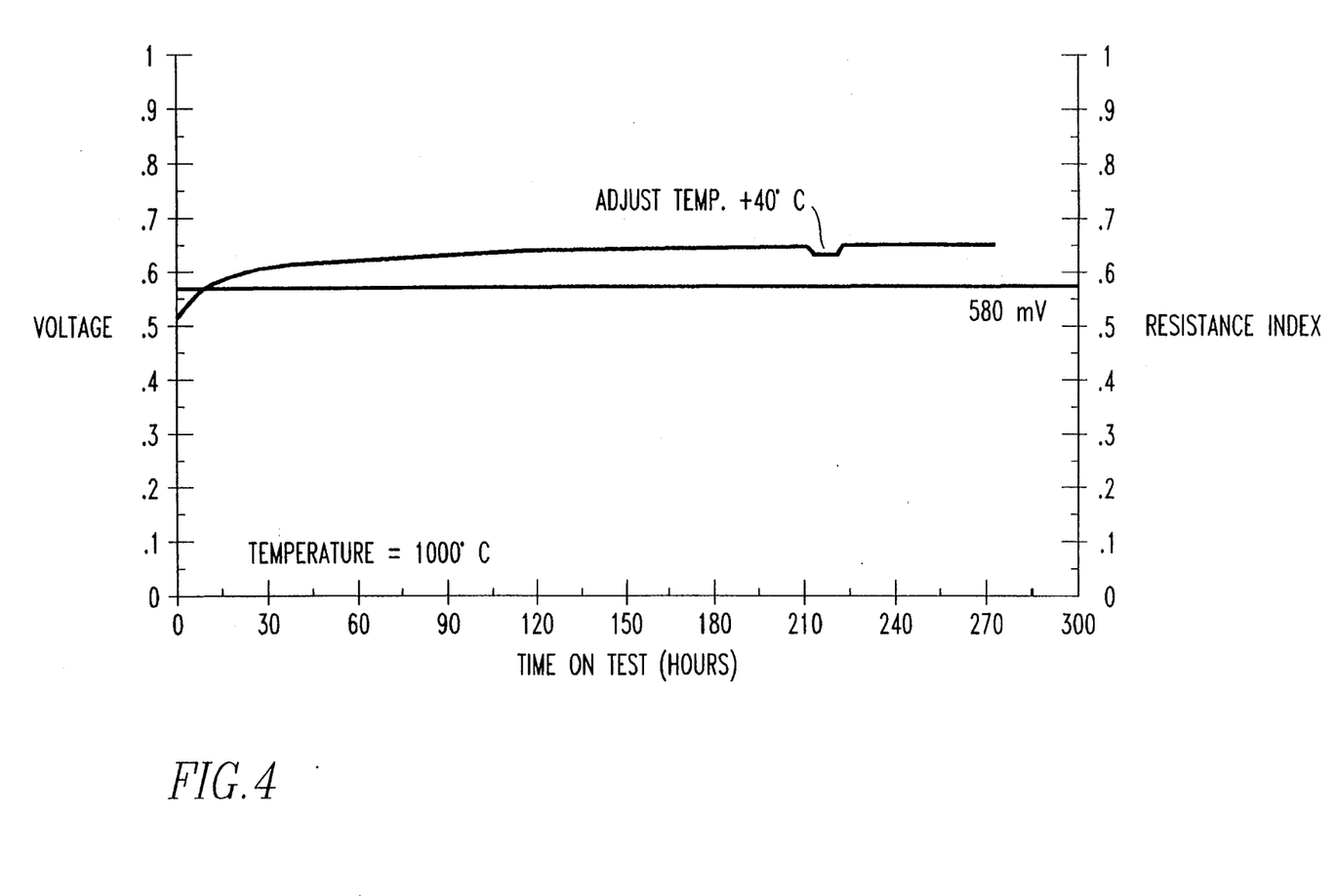
FIG. 4 is the electrical performance data of an electrochemical cell having a plasma arc sprayed interconnection layer post treated with a mixture of $CaO+Cr_2O_3$ and heat according to the method of the invention.
Figure 5:
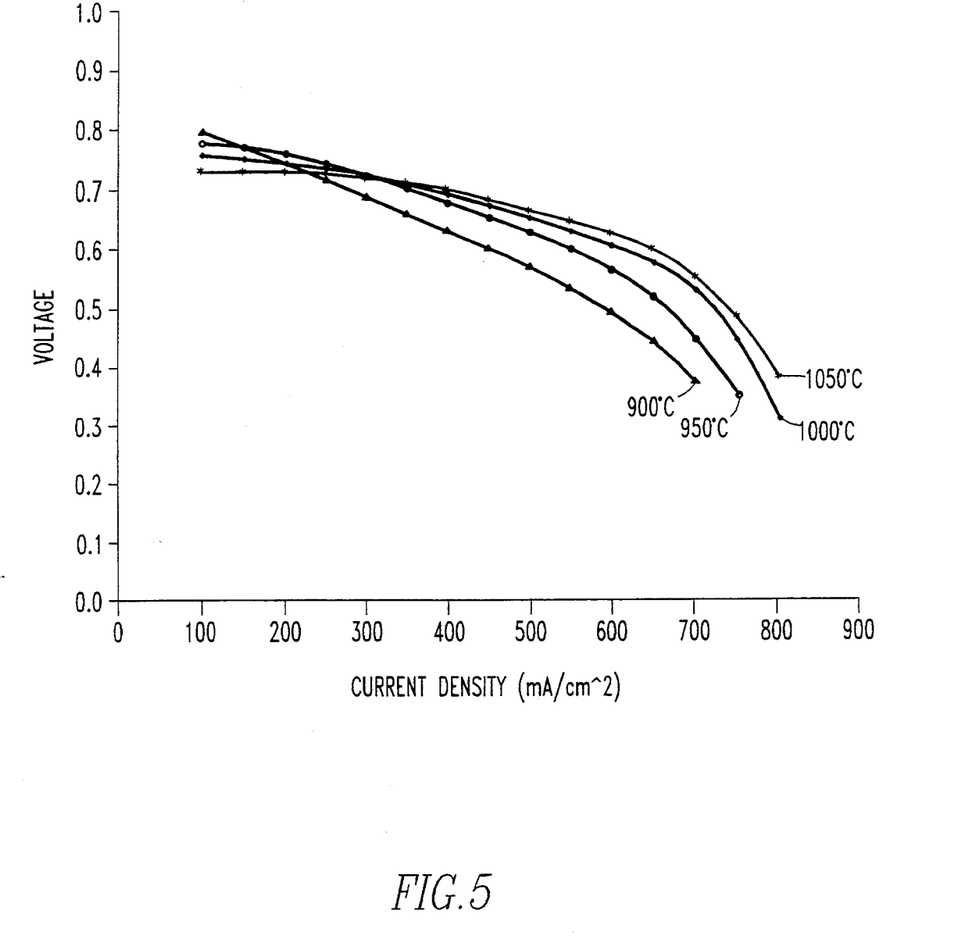
FIG. 5 is a current-voltage or loading capacity plot for an electrochemical cell having a plasma arc sprayed interconnection layer post treated with a mixture of $CaO+Cr_2O_3$ and heat according to the method of the invention.

The interconnection layer was also plated with nickel. After plating, the cell was electrically tested at about 1000° C. The electrical performance and current-voltage characteristics of the cell were tested and the results are shown in FIGS. 4 and 5, respectively. The electrical performance of the cell demonstrates the leak tightness of the interconnection formed according to the method of the invention.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A method of forming a dense, substantially gas-tight, electrically conductive interconnection layer on a porous electrically conductive electrode structure, comprising the steps of:
   a. providing an electrode structure;
   b. forming by thermal spraying a doped LaCrO$_3$ powder, on a selected portion of the electrode structure, a layer of porous, doped LaCrO$_3$ interconnection material bonded to the electrode surface;
   c. depositing on the surface of said porous, doped LaCrO$_3$ layer a mixture comprising CaO and Cr$_2$O$_3$ capable of forming, in part, liquid CaCrO$_4$ upon heating; and,
   d. heating said porous, doped LaCrO$_3$ layer with the CaO and Cr$_2$O$_3$ surface deposit in air at from about 1000° C. to 1200° C. to form, in part, liquid CaCrO$_4$, such that the pores of said porous thermally sprayed porous doped LaCrO$_3$ interconnection layer are substantially closed, at least on the surface, to provide a dense, substantially gas-tight, electrically conductive interconnection material bonded to the electrode surface.

2. The method of claim 1 wherein the doped LaCrO$_3$ layer of step b) and step d) each independently have the general formula La$_{1-x}$M$_x$Cr$_{1-y}$N$_y$O$_3$, where M is a dopant selected from the group consisting of Ca, Sr, Ba, and mixtures thereof, N is a dopant selected from the group consisting of Mg, Co, Ni, Al, and mixtures thereof, and, x and y are each independently about 0.01–0.25.

3. The method of claim 1, wherein the heating step d) is from about 1100° to 1200° C.

4. The method of claim 1, wherein the heating of step d) closes the pores of the porous, doped LaCrO$_3$ layer substantially at the surface.

5. The method of claim 1, wherein the electrode is an air electrode, a solid oxide electrolyte is applied to the unselected portion of the electrode surface, and wherein a fuel electrode is applied to the solid electrolyte, to form an electrochemical cell.

6. The method of claim 5, wherein the heating of step d) closes the pores of the porous, doped LaCrO$_3$ layer substantially at the surface facing the fuel electrode.

7. The method of claim 5, wherein the air electrode is porous, doped $LaMnO_3$, the solid oxide electrolyte is substantially gas-tight, yttria stabilized $ZrO_2$, and the fuel electrode is porous, nickel-zirconia cermet.

8. The method of claim 1, wherein the electrode structure is generally tubular.

9. The method of claim 1, wherein the electrode structure is generally planar.

10. The method of claim 1, wherein the thermal spraying of step (b) comprises plasma arc spraying.

11. The method of clairol, wherein the CaO and $Cr_2O_3$ is deposited in step (c) using a slurry solution.

12. The method of claim 1, wherein the CaO and $Cr_2O_3$ is deposited in step (c) using a tape.

13. The method of claim 1, wherein the doped $LaCrO_3$ powder of step (b) is agglomerated.

14. The method of claim 1, wherein the doped $LaCrO_3$ powder of step (b) is compensated with $Cr_2O_3$.

15. The method of claim 1, wherein the doped $LaCrO_3$ powder of step (b) is compensated with dopant.

16. A dense, substantially gas-tight, thermally sprayed, electrically conductive interconnection layer produced according to claim 1.

17. A method of forming a dense, substantially gas-tight, electrically conductive interconnection layer on a porous electrically conductive electrode structure, comprising the steps of:
   a. providing an electrode structure;
   b. forming by thermal spraying a doped $ABO_3$ perovskite powder, on a selected surface portion of the electrode structure, a layer of porous, doped $ABO_3$ perovskite interconnection material bonded to the electrode surface;
   c. depositing on the surface of said porous, doped $ABO_3$ perovskite layer a mixture comprising CaO and $Cr_2O_3$ capable of forming, in part, liquid $CaCrO_4$ upon heating; and,
   d. heating said porous, doped $ABO_3$ layer with the CaO and $Cr_2O_3$ surface deposit in air at from about 1000° C. to 1200° C. to form, in part, liquid $CaCrO_4$, such that the pores of said porous thermally sprayed porous doped $ABO_3$ interconnection layer are substantially closed, at least on the surface, to provide a dense, substantially gas-tight, electrically conductive interconnection material bonded to the electrode surface.

18. A high temperature, solid oxide electrolyte electrochemical cell, comprising:
   a first electrode;
   a solid oxide electrolyte disposed on a first portion of the first electrode;
   a second electrode disposed on a portion of the solid electrolyte;
   an electrically conductive, substantially gas-tight interconnection material disposed on a second portion of the first electrode for electrical coupling to the cell, said interconnection material comprising a thermally sprayed doped $LaCrO_3$ layer having pores, and subsequently coated with a mixture of $CaO + Cr_2O_3$ and heated to temperatures of about 1000° C. to 1200° C. to substantially close the pores, at least on the surface of the thermally sprayed doped $LaCrO_3$ layer.

19. The high temperature, solid oxide electrolyte electrochemical cell of claim 18, wherein the first electrode is an air electrode and the second electrode is a fuel electrode.

* * * * *